(12) United States Patent
Katsuta et al.

(10) Patent No.: US 7,964,116 B2
(45) Date of Patent: Jun. 21, 2011

(54) AQUEOUS PRIMER COMPOSITION AND COATING METHOD USING THE COMPOSITION

(75) Inventors: Hideaki Katsuta, Hiratsuka (JP); Masaharu Ishiguro, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 484 days.

(21) Appl. No.: 12/145,423

(22) Filed: Jun. 24, 2008

(65) Prior Publication Data

US 2009/0004487 A1    Jan. 1, 2009

(30) Foreign Application Priority Data

Jun. 29, 2007    (JP) ................................. 2007-171761

(51) Int. Cl.
*H01B 1/22* (2006.01)
*C09D 123/26* (2006.01)
*C09D 5/00* (2006.01)
*C09D 5/24* (2006.01)

(52) U.S. Cl. ..................... 252/512; 252/518.1

(58) Field of Classification Search .................. 252/512, 252/518.1; 428/414, 922; 524/515, 786; 427/331, 372.2, 402

See application file for complete search history.

(56) References Cited

U.S. PATENT DOCUMENTS

| | | | |
|---|---|---|---|
| 5,425,969 | A | 6/1995 | Wakabayashi et al. |
| 5,575,957 | A | 11/1996 | Okuda et al. |
| 5,705,098 | A | 1/1998 | Okuda et al. |
| 2006/0097230 | A1 | 5/2006 | Hareyama et al. |
| 2006/0188654 | A1 | 8/2006 | Onoyama et al. |
| 2007/0129485 | A1* | 6/2007 | Iida et al. .................. 524/515 |
| 2007/0259123 | A1 | 11/2007 | Nagano et al. |
| 2010/0143651 | A1* | 6/2010 | Silvis et al. .................. 428/141 |

FOREIGN PATENT DOCUMENTS

| | | |
|---|---|---|
| EP | 1 647 583 A1 | 4/2006 |
| JP | 6-165966 | 6/1994 |
| JP | 9-12314 | 1/1997 |
| JP | 10-53417 | 2/1998 |
| JP | 2006-219521 | 8/2006 |
| WO | WO 2004/010439 | 1/2004 |
| WO | WO 2005/012449 | 2/2005 |
| WO | WO 2005/012449 A1 | 2/2005 |
| WO | WO 2006/019171 A1 | 2/2006 |
| WO | WO 2007/046532 A1 | 4/2007 |

OTHER PUBLICATIONS

European Search Report dated Sep. 29, 2008, for corresponding European application 08104423.2, indicating relevance of listed reference in this IDS.

* cited by examiner

*Primary Examiner* — Mark Kopec
(74) *Attorney, Agent, or Firm* — Christie, Parker & Hale, LLP.

(57) ABSTRACT

An aqueous primer composition comprising (A) a modified polyolefin aqueous dispersion, (B) an aqueous urethane resin and/or aqueous acrylic resin, (C) a conductive metal oxide and (D) aluminum flakes, characterized in that the solid mass ratio of component (A)/component (B) is in the range of 15/85-80/20, component (C) is present in a range of 50-300 parts by mass with respect to 100 parts by mass of the total resin solid portion in the composition, and component (D) is present in a range of 1-30 parts by mass with respect to 100 parts by mass of the total resin solid portion in the composition. It is possible to form high-brightness and high-chroma paint colors on plastic molded articles such as automobile bumpers, and to form primer coating films with sufficient conductivity and excellent water resistance and humidity resistance.

10 Claims, No Drawings

AQUEOUS PRIMER COMPOSITION AND COATING METHOD USING THE COMPOSITION

CROSS-REFERENCE TO RELATED APPLICATION

This application claims priority of Japanese Patent Application Number 2007-171761, filed on Jun. 29, 2007.

BACKGROUND OF THE INVENTION

1. Field of the Invention

The present invention relates to an aqueous primer composition that can form high-brightness and high-chroma paint colors on plastic molded articles such as automobile bumpers, and that is capable of forming primer coating films with sufficient conductivity and excellent water resistance and humidity resistance, as well as to a coating method using the composition.

2. Description of the Related Art

Plastic materials used in automobile bumpers and the like normally have volume resistivity of about $10^{10}$ $\Omega/cm^2$ or greater, and because it is difficult to accomplish direct coating of such plastic molded articles by electrostatic coating methods which generally offer superior coating efficiency, it is common in the prior art to first apply a conductive primer coating onto the material surface and then carry out electrostatic coating of the top coat which is to provide the color (for example, see Japanese Unexamined Patent Publication HEI No. 6-165966).

Plastic materials such as mentioned above generally have dark colors such as black, and when they are to be coated with tints or low-opacity top coats, their conductive primer coats must be highly opaque or brightly colored. Several electrically conductive coatings have been proposed that employ high conductive fillers with relatively high brightness (for example, see Japanese Unexamined Patent Publication HEI No. 9-12314, Japanese Unexamined Patent Publication HEI No. 10-53417, Japanese Unexamined Patent Publication No. 2006-219521). Antimony-doped conductive fillers, which exhibit relatively high brightness and satisfactory conductivity among such fillers, have the drawback of toxicity, while needle-like conductive materials are avoided from the viewpoint of safety and hygiene.

When water-based coatings are used among the aforementioned electrically conductive coatings, with a view toward safety and hygiene and environmental conservation, it is necessary to employ large amounts of emulsifier to form aqueous dispersions of chlorinated polyolefins or the like, that are used as vehicle components, while the primers containing such components often yield coated films with inadequate water resistance and humidity resistance, with particular problems of reduced water resistance, humidity resistance and gasohol resistance being presented when thick films are formed by low-temperature baking at below 90° C.

BRIEF SUMMARY OF THE INVENTION

It is an object of the present invention to provide an aqueous primer composition that can form high-brightness and high-chroma paint colors on plastic molded articles such as automobile bumpers, that is capable of forming primer coating films with sufficient conductivity and excellent water resistance and humidity resistance, and that forms coated films with excellent water resistance, humidity resistance and gasohol resistance even when thick-films are formed by low-temperature baking at below 90° C., as well as to provide a plastic molded article coating method that employs the composition.

In order to achieve the objects stated above, the invention provides an aqueous primer composition comprising (A) an aqueous polyolefin aqueous dispersion, (B) an aqueous urethane resin and/or aqueous acrylic resin, (C) a conductive metal oxide and (D) aluminum flakes, characterized in that the solid mass ratio of component (A)/component (B) is in the range of 15/85-80/20, component (C) is present in a range of 50-300 parts by mass with respect to 100 parts by mass of the total resin solid portion in the composition, and component (D) is present in a range of 1-30 parts by mass with respect to 100 parts by mass of the total resin solid portion in the composition, as well as a plastic molded article coating method characterized by coating a plastic molded article with the composition and then applying a top coat onto the coated surface by electrostatic coating.

According to the invention, it is possible to form high-brightness or high-chroma color coatings on plastic molded articles by combining a modified polyolefin aqueous dispersion, an aqueous urethane resin and/or aqueous acrylic resin and a specific conductive material in specified amounts, and to form primer coating films with adequate conductivity and excellent water resistance and humidity resistance, allowing formation of primer coating films with excellent water resistance, humidity resistance and gasohol resistance even when forming thick-films by low-temperature baking at below 90° C.

DETAILED DESCRIPTION OF THE INVENTION

Preferred modes of the invention will now be explained in detail.

The aqueous primer composition of the invention comprises a modified polyolefin aqueous dispersion (A). Modified polyolefins generally include modified polyolefins obtained by unsaturated carboxylic acid or acid anhydride modification, acryl modification, chlorinating modification or combinations of such modifications of polyolefins, and particularly preferred are unsaturated carboxylic acid- or acid anhydride-modified polyolefins (i).

An unsaturated carboxylic acid- or acid anhydride-modified polyolefin (i) is usually modified by employing a known method for graft copolymerization of a polyolefin obtained by polymerizing one or more compounds selected from among C2-10 olefins such as ethylene, propylene, butylene and hexene, with an unsaturated carboxylic acid such as (meth)acrylic acid, maleic acid, fumaric acid or itaconic acid or an acid anhydride thereof, and most preferably it is modified using maleic acid or its acid anhydride. The extent of graft copolymerization with the unsaturated carboxylic acid or its acid anhydride is preferably in the range of 1-20 mass % and more preferably 2-10 mass % with respect to the solid mass of the polyolefin.

As polyolefins to be used for the unsaturated carboxylic acid- or acid anhydride-modified polyolefin (i) there are preferred polyolefins produced using single-site catalysts as the polymerization catalysts, from the viewpoint of obtaining a more narrow molecular weight distribution of the polyolefin and achieving superior random copolymerization. In a single-site catalyst, all of the active sites are of the same type (single site), and particularly preferred single-site catalysts are metallocene-based catalysts which are generally obtained by combining a metallocene (a bis(cyclopentadienyl) metal complex or a derivative thereof), as a transition metal compound of Groups 4-6 or 8 or a rare earth transition metal compound of Group 3 of the Periodic Table, having at least one conjugated five-membered ring ligand, with a co-catalyst such as an aluminoxane which is capable of activating it, or an organic aluminum compound such as trimethylaluminum. The process for production of the polyolefin may be any process known in the prior art, and for example, there may be mentioned a process of production with continuous addition of an alkylaluminum compound and a metallocene-based catalyst while supplying propylene or ethylene and hydrogen to the reactor.

The unsaturated carboxylic acid or acid anhydride-modified polyolefin (i) may also be acryl-modified if necessary. As examples of polymerizable unsaturated monomers to be used for acryl modification there may be mentioned alkyl esters of (meth)acrylic acid such as methyl (meth)acrylate, ethyl (meth)acrylate, n- or i-propyl (meth)acrylate, n-, i- or t-butyl (meth)acrylate, 2-ethylhexyl (meth)acrylate, cyclohexyl (meth)acrylate, lauryl (meth)acrylate, stearyl (meth)acrylate and the like, and acrylic monomers such as (meth)acrylic acid, glycidyl (meth)acrylate, 2-hydroxyethyl (meth)acrylate, (meth)acrylamide and (meth)acrylonitrile, as well as styrene, and any of these may be used alone or in combinations of two or more.

Throughout the present specification, the term "(meth) acrylic" means "acrylic or methacrylic", and the term "(meth) acrylate" means "acrylate or methacrylate".

The method used for acryl modification may be, for example, a method involving first reaction with glycidyl (meth)acrylate, 2-hydroxyethyl (meth)acrylate or the like, which is reactive with the carboxyl group of the unsaturated carboxylic acid- or acid anhydride-modified polyolefin, for introduction of a polymerizable unsaturated group, followed by copolymerization of the polymerizable unsaturated group-introduced unsaturated carboxylic acid- or acid anhydride-modified polyolefin using another single monomer or combination of two or more monomers. The amount of polymerizable unsaturated monomer used for acryl modification is preferably in the range of no greater than 85 mass % and preferably 0.1-80 mass % of the solid mass in the modified polyolefin, from the viewpoint of compatibility with other components and adhesion of the formed coating film.

The unsaturated carboxylic acid or acid anhydride-modified polyolefin (i) may also be chlorinated if necessary. Chlorination of the polyolefin may be accomplished by blowing chlorine gas into an organic solvent solution or dispersion of the polyolefin or its modified form, and the reaction temperature may be 50-120° C. The chlorine content of the chlorinated polyolefin (solid portion) may be adjusted according to the desired physical properties for the chlorinated polyolefin, but from the viewpoint of adhesion of the formed coated film, it is generally preferred to be no greater than 35 mass %, particularly 10-30 mass % and especially 12-25 mass % based on the mass of the chlorinated polyolefin.

The polyolefin used for the unsaturated carboxylic acid- or acid anhydride-modified polyolefin (i) is most preferably one containing propylene as a polymerizing component, and the mass fraction of propylene in the unsaturated carboxylic acid- or acid anhydride-modified polyolefin (i) is preferably 0.5-0.99 and more preferably 0.7-0.95 from the viewpoint of compatibility with other components and adhesion of the formed coating film.

The unsaturated carboxylic acid- or acid anhydride-modified polyolefin (i) has a melting point of no higher than 120° C. and preferably 50-100° C., and a mass-average molecular weight (Mw) of 30,000-200,000 and preferably 50,000-120,000. Outside of these ranges, the object of the invention may not be achieved and the compatibility with other components and interlayer adhesion between the polyolefin and top coating film layer of the formed coated film may be reduced. The heat of fusion of the modified polyolefin (i) is preferably in the range of 1-50 mJ/mg and more preferably 2-50 mJ/mg from the viewpoint of adhesion.

The melting point and heat of fusion referred to here are determined by measuring the quantity of heat released by 20 mg of modified polyolefin with temperature increase from −100° C. to 150° C. at a temperature-elevating rate of 10° C./min, using a "DSC-5200" (trade name of Seiko Instruments, Inc.). The melting point may be adjusted by varying the composition of the polyolefin, and particularly the α-olefin monomer content. When the heat of fusion is difficult to measure, the measuring sample may be heated to 120° C. and then cooled at 10° C./min for at least 2 days and the quantity of heat measured thereafter by the method described above.

The mass-average molecular weight of the modified polyolefin is the value of the mass-average molecular weight measured by gel permeation chromatography and expressed in terms of the mass-average molecular weight of polystyrene, and it was measured using a "HLC/GPC150C" (60 cm×1, product of Water Co.) with a column temperature of 135° C., o-dichlorobenzene as the solvent and a flow rate of 1.0 ml/min. The injection sample was prepared by dissolving polyolefin to a solution concentration of 5 mg in 3.4 ml of o-dichlorobenzene, at 140° C. over a period of 1-3 hours. The column used for gel permeation chromatography may be a "GMH$_{HR}$-H(S) HT" (trade name of Tosoh Corp.).

According to the invention, the ratio of the mass-average molecular weight and number-average molecular weight (Mw/Mn) of the unsaturated carboxylic acid- or acid anhydride-modified polyolefin (i) is 1.5-4.0 and preferably 2.0-3.5, from the viewpoint of compatibility with other components and adhesion of the formed coating film.

Also according to the invention, the unsaturated carboxylic acid- or acid anhydride-modified polyolefin (i) may be modified using a compound with a polyoxyalkylene chain, from the viewpoint of imparting humidity resistance and gasohol resistance.

As the polyoxyalkylene chain in the compound with a polyoxyalkylene chain, there may be used a polyoxyethylene chain, polyoxypropylene chain or a polyoxyethylene and polyoxypropylene block chain.

The compound with a polyoxyalkylene chain may have a number-average molecular weight in the range of 400-3,000 and preferably 500-2,000. The number-average molecular weight is preferably not less than 400 because the effect of the hydrophilic groups will not be sufficiently exhibited and the film performance (especially water resistance) may be adversely affected, while it is also preferably not greater than 3,000 because the compound will solidify at room temperature and exhibit poor solubility, making it difficult to manage.

The modified polyolefin used is not particularly restricted so long as it has been modified by a compound with a polyoxyalkylene chain as described above, and there are most preferably used modified polyolefins obtained by reacting an unsaturated carboxylic acid- or acid anhydride-modified polyolefin (i) with a compound having a polyoxyalkylene chain with a hydroxyl or amino group at one end (ii), or if an unsaturated carboxylic acid- or acid anhydride-modified polyolefin (i) is to be acryl-modified, by using a compound having a polyoxyalkylene chain with a polymerizable unsaturated group at one end (iii).

As examples for the compound having a polyoxyalkylene chain with a hydroxyl or amino group at one end (ii), to be used for modification of the unsaturated carboxylic acid- or acid anhydride-modified polyolefin (i), there may be mentioned polyoxyalkylene alkyl ethers such as polyoxyethylene stearyl ether; polyoxyalkylene alkylphenyl ethers such as polyoxyethylene nonylphenyl ether and polyoxyethylene dodecylphenyl ether; polyoxyalkylene fatty acid esters such as polyoxyethylene fatty acid esters; and polyoxyalkylene-alkylamines such as ethylene oxide-propylene oxide polymer addition products of polyoxyethylenealkylamine and alkylalkanolamine, and any of the above may be used alone or in combinations of two or more.

The reaction between the unsaturated carboxylic acid- or acid anhydride-modified polyolefin (i) and the compound having a polyoxyalkylene chain with a hydroxyl or amino group at one end (ii) may be carried out by hot-melting the unsaturated carboxylic acid- or acid anhydride-modified polyolefin (i) at 80-200° C., adding compound (ii), with further addition of a basic substance if necessary, and heating. It is preferably used in a proportion of 0.5-50 parts by mass and preferably 0.5-25 parts by mass of compound (ii) with respect to 100 parts by solid mass of compound (i).

As examples for the compound (iii) having a polyoxyalkylene chain with a polymerizable unsaturated group at one end, which is used to modify the unsaturated carboxylic acid- or acid anhydride-modified polyolefin (i), there may be mentioned polyethyleneglycol (meth)acrylate, polypropyleneglycol (meth)acrylate, polyoxyethylene methyl ether (meth)acrylate, polyoxypropylene methyl ether (meth)acrylate, polyoxyethylene lauryl ether (meth)acrylate, polyoxyethylene nonylphenyl ether (meth)acrylate, polyoxyethylene lauryl ether maleic acid ester and allyl group-containing polyoxyethylene nonylphenyl ether, and any of the above may be used alone or in combinations of two or more.

The reaction between the unsaturated carboxylic acid- or acid anhydride-modified polyolefin (i) and the compound having a polyoxyalkylene chain with a polymerizable unsaturated group at one end (iii) may be carried out by hot-melting the unsaturated carboxylic acid- or acid anhydride-modified polyolefin (i) at 80-200° C., adding glycidyl (meth)acrylate or 2-hydroxyethyl (meth)acrylate, for example, which is reactive with the carboxyl groups in the unsaturated carboxylic acid- or acid anhydride-modified polyolefin, for acryl modification as explained above, if necessary with addition of a polymerization inhibitor or basic substance, and heating to introduce a polymerizable unsaturated group into the modified polyolefin (i), and then adding compound (iii), with further addition of a polymerization initiator if necessary, and heating the mixture. The proportion is preferably 0.5-50 parts by mass and more preferably 0.5-25 parts by mass of compound (iii) with respect to 100 parts by solid mass of compound (i).

According to the invention, the modified polyolefin aqueous dispersion (A) is obtained by dispersing the modified polyolefin obtained in the manner described above in an aqueous medium, and optionally, if necessary, neutralizing all or a portion of the carboxyl groups in the modified polyolefin with an amine compound and/or adding an emulsifier. When the modified polyolefin has a polyoxyalkylene chain, it may be possible to disperse the modified polyolefin in the aqueous medium without using an amine compound or emulsifier, or using only small amounts thereof.

As examples of amine compounds there may be mentioned tertiary amines such as triethylamine, tributylamine, dimethylethanolamine and triethanolamine; secondary amines such as diethylamine, dibutylamine, diethanolamine and morpholine; and primary amines such as propylamine and ethanolamine.

The aforementioned amine compounds are preferably used in an amount in the range of 0.1-1.0 molar equivalents with respect to the carboxyl groups in the modified polyolefin.

As examples of emulsifiers there may be mentioned nonionic emulsifiers such as polyoxyethylene monooleyl ether, polyoxyethylene monostearyl ether, polyoxyethylene monolauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate and polyoxyethylene sorbitan monolaurate; and anionic emulsifiers such as sodium salts or ammonium salts of alkylsulfonic acid, alkylbenzenesulfonic acid and alkylphosphoric acid; as well as polyoxyalkylene group-containing anionic emulsifiers having an anionic group and a polyoxyalkylene group such as a polyoxyethylene group or polyoxypropylene group in the molecule or reactive anionic emulsifiers having an anionic group and a polymerizable unsaturated group in the molecule, any of which may be used alone or in combinations of two or more.

The aforementioned emulsifiers are preferably used in amounts in a range of no greater than 25 parts by mass and preferably 0.5-20 parts by mass with respect to 100 parts by solid mass of the modified polyolefin.

The aqueous primer composition of the invention comprises an aqueous urethane resin and/or aqueous acrylic resin (B).

The aqueous urethane resin is a water-soluble or water-dispersible resin with a urethane bond in the molecule, and there may be mentioned self-emulsifiable emulsions with an acid value and emulsions or water-soluble resins combined with emulsifiers, which are preferably used in the form of dispersions. A urethane dispersion is usually a dispersion obtained by reacting a diol and a diisocyanate, if necessary with a dimethylolalkanoic acid or the like, in the presence of an emulsifier to obtain a urethane prepolymer, and dissolving the prepolymer in water with forced emulsification or self-emulsification.

The skeleton of the aqueous urethane resin may be, for example, ether-based, carbonate-based or ester-based, but it is preferably ether-based or carbonate-based from the viewpoint of water resistance of the formed coating. The aqueous urethane resin may also contain a hydroxyl group.

The aqueous acrylic resin may be a water-soluble acrylic resin with a mass-average molecular weight in the range of 5,000-100,000 and preferably 5,000-50,000, or an acrylic resin emulsion with a mass-average molecular weight of 50,000 or greater and preferably 100,000 or greater, usually obtained by copolymerizing a mixture of a hydrophilic group-containing polymerizable unsaturated monomer such as a carboxyl group-containing polymerizable unsaturated monomer and another polymerizable unsaturated monomer. The mass-average molecular weight is the mass-average molecular weight measured by gel permeation chromatography using tetrahydrofuran as the solvent, and calculated based on the mass-average molecular weight of polystyrene. A "HLC8120GPC" (trade name of Tosoh Corp.) was used as the gel permeation chromatography apparatus, and four columns used for gel permeation chromatography: "TSKgel G-4000H×L", "TSKgel G-3000H×L", "TSKgel G-2500H× L" and "TSKgel G-2000H×L" (trade names of Tosoh Corp.).

As examples of carboxyl group-containing polymerizable unsaturated monomers there may be mentioned (meth)acrylic acid, crotonic acid, maleic acid, fumaric acid, itaconic acid and half monoalkyl esters of these dicarboxylic acids, and as examples of other hydrophilic group-containing polymerizable unsaturated monomers there may be mentioned polyalkylene chain-containing polymerizable unsaturated monomers such as polyethyleneglycol (meth)acrylate and polypropyleneglycol (meth)acrylate; sulfonic acid group-containing polymerizable unsaturated monomers such as 2-acrylamide-2-methylpropanesulfonic acid or sulfoalkyl (meth)acrylates such as 2-sulfoethyl (meth)acrylate; tertiary amino group-containing polymerizable unsaturated monomers such as N,N-dimethylaminoethyl (meth)acrylate and N,N-diethylaminoethyl (meth)acrylate; quaternary ammonium base-containing polymerizable unsaturated monomers such as 2-(methacryloyloxy)ethyltrimethylammonium chloride and 2-(methacryloyloxy)ethyltrimethylammonium bromide; and quaternary ammonium chlorinated carboxyl group-containing polymerizable unsaturated monomers.

As examples of other polymerizable unsaturated monomers there may be mentioned C1-24 alkyl esters or cycloalkyl esters of acrylic acid or methacrylic acid, such as methyl (meth)acrylate, ethyl (meth)acrylate, n- or i-propyl (meth)acrylate, n-, i- or t-butyl (meth)acrylate, 2-ethylhexyl (meth)acrylate, cyclohexyl (meth)acrylate, lauryl (meth)acrylate, isobornyl (meth)acrylate and the like; hydroxyalkyl esters of acrylic acid or methacrylic acid such as 2-hydroxyethyl (meth)acrylate, 2- or 3-hydroxypropyl (meth)acrylate and 4-hydroxybutyl (meth)acrylate; and glycidyl (meth)acrylate, acrylonitrile, acrylamide, styrene, vinyltoluene, vinyl acetate, vinyl chloride, 1,6-hexanediol diacrylate and the like, any of which may be used alone or in combinations of two or more.

There are no particular restrictions on copolymerization of the monomer mixture and it may be carried out by a known process, such as by a solution polymerization process for a water-soluble acrylic resin or by an emulsion polymerization process for an acrylic resin emulsion.

When the aqueous acrylic resin is an acrylic resin emulsion obtained by emulsion polymerization, it may be a multilayer-structure particulate emulsion obtained by multistage emulsion polymerization using a monomer mixture in the presence of water and an emulsifier.

The acidic groups such as carboxyl groups derived from the hydrophilic group-containing polymerizable unsaturated monomer in the aqueous acrylic resin may, if necessary, be neutralized using a basic substance. The basic substance is preferably water-soluble, and as examples there may be mentioned ammonia, methylamine, ethylamine, propylamine, butylamine, dimethylamine, trimethylamine, triethylamine, ethylenediamine, morpholine, methylethanolamine, dimethylethanolamine, diethanolamine, triethanolamine, diisopropanolamine, 2-amino-2-methylpropanol and the like, which may be used alone or in combinations of two or more.

The aqueous acrylic resin preferably contains a hydroxyl group, with a hydroxyl value of 20-200 mgKOH/g and preferably 20-150 mgKOH/g and an acid value of 1-100 mgKOH/g and preferably 10-70 mgKOH/g, from the viewpoint of aqueous dispersibility, compatibility with other components and curability of the formed coated film.

According to the invention, the aqueous dispersion (A) and resin (B) are used in a ratio of 15/85-80/20 and preferably 20/80-75/25 as the solid mass ratio of component (A)/component (B). The ratio is preferably not outside of this range in order to avoid reducing the adhesion for the material of the formed coated film, the water resistance and the gasohol resistance.

The aqueous primer composition of the invention comprises a conductive metal oxide (C) and aluminum flakes (D) as conductive materials. A globular conductive metal oxide (c-1) is preferred as the conductive metal oxide (C) from the viewpoint of storage stability of the composition and the finished appearance of the coated film, while a flakey conductive metal oxide (c-2) may also be used with the globular conductive metal oxide (c-1) for improved conductivity.

The globular conductive metal oxide (c-1) preferably has a mean particle size of 0.05-1 μm and more preferably 0.1-0.5 μm from the viewpoint of storage stability of the composition and the finished appearance of the coated film. The mean particle size is the value obtained using a laser diffraction scattering analyzer ("MICROTRAC FRA", trade name of Nikkiso Co., Ltd.).

As examples of (c-1) there may be mentioned oxides composed mainly of tin oxide, or compounds with a conductive layer containing tin oxide or nickel oxide, phosphorus or antimony on the surface of titanium oxide, silica, zinc oxide or barium sulfate as the base material, and as specific commercial products there may be mentioned ET500W and ET521W (both products of Ishihara Sangyo Kaisha, Ltd.) Particularly preferred among these are conductive titanium oxides with a tin oxide-containing conductive layer surface. Preferred as conductive titanium oxides with a titanium-containing conductive layer surface, from the viewpoint of conductivity and brightness, are those having tin oxide in a proportion with respect to titanium oxide so that Sn/Ti=10/90-50/50 (mass ratio), while antimony-free oxides are preferred from environmental considerations.

The flakey conductive metal oxide (c-2) preferably has a mean length of 5-30 μm and more preferably 8-25 μm and a mean thickness of 0.01-1 μm and more preferably 0.02-1 μm, from the viewpoint of finished appearance and conductivity. The mean length is the value obtained using a laser diffraction scattering analyzer ("MICROTRAC FRA", trade name of Nikkiso Co., Ltd.), and the mean thickness is the value calculated from direct observation with an electron microscope.

As examples of (c-2) there may be mentioned flakey titanium oxide and metal oxides with tin oxide or a conductive layer containing nickel oxide, phosphorus or antimony on the surface of mica or the like as the base material, and as specific commercial products there may be mentioned DENTOLE TM200 (product of Otsuka Chemical Co., Ltd.) and MINATEC 40CM and MINATEC 30CM (both products of Merck, Ltd.). Particularly preferred among these are conductive titanium oxides and/or conductive micas with a tin oxide-containing conductive layer surface. Preferred as conductive titanium oxides or conductive micas with a titanium-containing conductive layer surface, from the viewpoint of balance between conductivity and brightness, are those having tin oxide in a proportion with respect to titanium oxide or mica of 10/90-50/50 (mass ratio), while antimony-free oxides are preferred from environmental considerations.

The conductive material (C) may be present in a range of 50-300 parts by mass and preferably 120-200 parts by mass with respect to 100 parts by mass of the total resin solid portion in the composition of the invention. It is preferably not outside of this range because the conductivity will be insufficient and the adhesion and water resistance of the formed coated film may be reduced. When (c-1) and (c-2) are used in combination, they are preferably combined at a mass ratio in the range of 99/1-50/50 and more preferably 90/10-50/50 from the viewpoint of conductivity.

The aluminum flakes (D) preferably have mean lengths of 5-30 μm and more preferably 8-20 μm and mean thicknesses of 0.01-1 μm and more preferably 0.02-0.5 μm, from the viewpoint of finished appearance and conductivity. The mean length is the value obtained using a laser diffraction scattering analyzer ("MICROTRAC FRA", trade name of Nikkiso Co., Ltd.), and the mean thickness is the value calculated from direct observation with an electron microscope.

From the viewpoint of inhibiting reaction between water and the catalyst, the aluminum flakes (D) are preferably pretreated with a phosphoric acid ester or phosphate group-containing resin, and most preferably they are pretreated with a phosphate group-containing resin (iv) having an acid value of 10-200 mgKOH/g, obtained by copolymerizing a phosphate group-containing polymerizable unsaturated monomer and another polymerizable unsaturated monomer.

The phosphate group-containing polymerizable unsaturated monomer is not particularly restricted so long as it is a phosphate group-containing polymerizable unsaturated monomer represented by the following general formula (1):

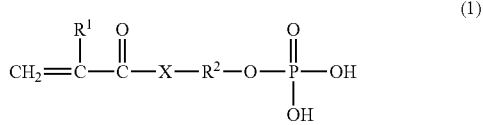

[wherein $R^1$ represents hydrogen or a methyl group, X represents —O— or —NH— and preferably —O— and $R^2$ represents a C1-30 divalent organic group]
and as examples there may be mentioned alkylene-modified phosphate group-containing polymerizable unsaturated monomers, oxyalkylene-modified phosphate group-containing polymerizable unsaturated monomers, polyester-modified phosphate group-containing polymerizable unsaturated monomers and polycarbonate-modified phosphate group-containing polymerizable unsaturated monomers, any of which may be used alone or in combinations of two or more. Particularly preferred from the viewpoint of water resistance and adhesion are one or more selected from among alkylene-modified phosphate group-containing polymerizable unsaturated monomers and oxyalkylene-modified phosphate group-containing polymerizable unsaturated monomers.

As examples of alkylene-modified phosphate group-containing polymerizable unsaturated monomers there may be mentioned 2-acryloyloxyethylacid phosphate, 2-methacryloyloxyethylacid phosphate, 2-acryloyloxypropylacid phosphate and 2-methacryloyloxypropylacid phosphate, any of which may be used alone or in combinations of two or more. Particularly preferred among the above are 2-acryloyloxyethylacid phosphate and 2-methacryloyloxyethylacid phosphate. As examples of the aforementioned oxyalkylene-modified phosphate group-containing polymerizable unsaturated monomers there may be mentioned acid phosphoxytetra(oxyethylene)glycol monomethacrylate, acid phosphoxypenta(oxyethylene)glycol monomethacrylate, acid phosphoxypenta(oxypropylene)glycol monomethacrylate, acid phosphoxyhexa(oxypropylene)glycol monomethacrylate and the like, any of which may be used alone or in combinations of two or more.

As examples of other polymerizable unsaturated monomers there may be mentioned C1-24 alkyl esters or cycloalkyl esters of acrylic acid or methacrylic acid such as methyl (meth)acrylate, ethyl (meth)acrylate, n- or i-propyl (meth) acrylate, n-, i- or t-butyl (meth)acrylate, 2-ethylhexyl (meth)acrylate, n-hexyl (meth)acrylate, octyl (meth)acrylate, 2-ethylhexyl (meth)acrylate, nonyl (meth)acrylate, tridecyl (meth) acrylate, lauryl (meth)acrylate, stearyl (meth)acrylate and "isostearyl acrylate" (product of Osaka Organic Chemical Industry, Ltd.), cyclohexyl (meth)acrylate, methylcyclohexyl (meth)acrylate, t-butylcyclohexyl (meth)acrylate, cyclododecyl (meth)acrylate and isobornyl (meth)acrylate; hydroxyalkyl esters of acrylic acid or methacrylic acid such as 2-hydroxyethyl (meth)acrylate, 2- or 3-hydroxypropyl (meth)acrylate and 4-hydroxybutyl (meth)acrylate; (meth) acrylic acid, maleic acid and crotonic acid; aromatic ring-containing polymerizable unsaturated monomers such as benzyl (meth)acrylate, styrene, α-methylstyrene and vinyltoluene; and glycidyl (meth)acrylate, acrylonitrile, acrylamide, vinyl acetate, vinyl chloride and the like, any of which may be used alone or in combinations of two or more. Preferred among the above from the viewpoint of water resistance of the obtained coated film are C6 or greater straight-chain, branched or cyclic polymerizable unsaturated monomers or aromatic ring-containing polymerizable unsaturated monomers containing saturated or unsaturated hydrocarbon groups.

The proportion of the phosphate group-containing polymerizable unsaturated monomer and other polymerizable unsaturated monomer is normally preferred to be in the range of 10/90-70/30, preferably 15/85-60/40 and even more preferably 20/80-55/45 as the mass ratio.

Copolymerization of these monomers may be accomplished by a known process such as a solution polymerization process in an organic solvent or an emulsion polymerization process in an aqueous medium, with solution polymerization being preferred. As an example of a copolymerization process by solution polymerization there may be mentioned a process in which a mixture of the phosphate group-containing polymerizable unsaturated monomer and the other polymerizable unsaturated monomer with a radical polymerization initiator is dissolved or dispersed in an organic solvent and heated while stirring, usually at a temperature of about 80-200° C. for about 1-10 hours, for polymerization.

Preferably, the phosphate group-containing resin (iv) obtained in this manner has an acid value in the range of 10-200 mgKOH/g, preferably 40-170 mgKOH/g and even more preferably 70-150 mgKOH/g and a hydroxyl value in the range of 15-200 mgKOH/g, preferably 20-140 mgKOH/g, even more preferably 30-100 mgKOH/g and most preferably 40-90 mgKOH/g.

The phosphate group-containing resin (iv) may be first neutralized with a base such as ammonia, dimethylamine, triethylamine, ethanolamine or 2-(dimethylamino)ethanol before being added to the coating material.

The ratio in which the aluminum flakes (D) and phosphate group-containing resin (iv) are used is in the range of 50/50-85/15 and preferably 70/30-85/15 as the mass ratio, from the viewpoint of conductivity and water resistance.

The aluminum flakes (D) may be present in a range of 1-30 parts by mass and preferably 5-15 parts by mass with respect to 100 parts by mass of the total resin solid portion in the composition of the invention. It is preferably not outside of this range because the conductivity will be insufficient and the adhesion and water resistance of the formed coated film may be reduced.

The aqueous primer composition of the invention may also contain, if necessary, a conductive material other than (C) or (D) or a known pigment that is ordinarily used in the field of coating materials, and specifically a color pigment or extender pigment, for example.

There are no particular restrictions on the conductive materials other than (C) or (D) so long as they can impart conductivity to the formed coated film, and for example, there may be mentioned conductive carbon such as conductive carbon black, carbon nanotubes, carbon nanofibers and carbon microcoils, metal powders such of silver, nickel, copper or graphite, and needle-like conductive metal oxides such as needle-like titanium oxide having tin oxide or antimony as a conductive layer on the surface, and any of these may be used alone or in combinations of two or more.

As examples of such color pigments there may be mentioned titanium dioxide, red iron oxide, aluminum paste, azo-based pigments and phthalocyanine-based pigments, and as examples of extender pigments there may be mentioned talc, silica, calcium carbonate, barium sulfate, zinc flower (zinc oxide) and the like, any of which may be used alone or in combinations of two or more.

The composition of the invention may also contain a crosslinking agent if necessary. As crosslinking agents there may be mentioned amino resins and/or (block) polyisocyanates, which will generally react with hydroxyl groups in the resin (B). An epoxy compound that reacts with the carboxyl groups in the modified polyolefin water-dispersed (A) may also be used as a crosslinking agent.

As examples of amino resins there may be mentioned melamine resins, urea resins and benzoguanamine resins, among which melamine resins are preferred. Particularly preferred as melamine resins are alkyl etherified melamine resins obtained by etherification with alkyl groups such as methyl, ethyl, n-butyl, isobutyl, hexyl or 2-ethylhexyl, and either hydrophobic or hydrophilic types may be used. These melamine resins may also have methylol or imino groups. The amino resin will generally have a number-average molecular weight in the range of 500-5,000, and it is preferably in the range of 800-3,000. The number-average molecular weight of the amino resin is the value of the number-average molecular weight measured by gel permeation chromatography using tetrahydrofuran as the solvent at a flow rate of 1.0 ml/min, calculated based on the number-average molecular weight of polystyrene. A "HLC8120GPC" (trade name of Tosoh Corp.) may be used as the gel permeation chromatography apparatus, and the columns used for gel permeation chromatography may be "TSKgel G-4000H×L", "TSKgel G-3000H×L", "TSKgel G-2500H×L" and "TSKgel G-2000H×L" (trade names of Tosoh Corp.).

The (block) polyisocyanate is preferably a polyisocyanate compound with two or more free isocyanate groups in the molecule, where the isocyanate groups are blocked with a blocking agent if necessary.

As examples of such polyisocyanate compounds there may be mentioned aliphatic polyisocyanates such as hexamethylene diisocyanate, trimethylhexamethylene diisocyanate, dimer acid diisocyanate and lysine diisocyanate; biuret type adducts and isocyanurate ring adducts of the aforementioned aliphatic polyisocyanates; alicyclic diisocyanates such as isophorone diisocyanate, 4,4'-methylenebis(cyclohexyl isocyanate), methylcyclohexane-2,4- or -2,6-diisocyanate, 1,3- or 1,4-di(isocyanatomethyl)cyclohexane, 1,4-cyclohexane diisocyanate, 1,3-cyclopentane diisocyanate and 1,2-cyclohexane diisocyanate; biuret type adducts and isocyanurate ring adducts of the aforementioned alicyclic diisocyanates; aromatic diisocyanate compounds such as xylylene diisocyanate, tetramethylxylylene diisocyanate, tolylene diisocyanate, 4,4'-diphenylmethane diisocyanate (MDI), 1,5-naphthalene diisocyanate, 1,4-naphthalene diisocyanate, 4,4'-toluidine diisocyanate, 4,4'-diphenyl ether diisocyanate, (m- or p-) phenylene diisocyanate, 4,4'-biphenylene diisocyanate, 3,3'-dimethyl-4,4'-biphenylene diisocyanate, bis(4-isocyanatophenyl)sulfone and isopropylidenebis(4-phenylisocyanate); biuret type adducts and isocyanurate ring adducts of the aforementioned aromatic diisocyanates; hydrogenated MDI and hydrogenated MDI derivatives; polyisocyanates with 3 or more isocyanate groups in the molecule such as triphenylmethane-4,4',4''-triisocyanate, 1,3,5-triisocyanatobenzene, 2,4,6-triisocyanatotoluene and 4,4'-dimethyldiphenylmethane-2,2',5,5'-tetraisocyanate; biuret type adducts and isocyanurate ring adducts of the aforementioned polyisocyanates; urethanated adducts obtained by reacting polyisocyanate compounds with the hydroxyl groups of polyols such as ethylene glycol, propylene glycol, 1,4-butylene glycol, dimethylolpropionic acid, polyalkylene glycol, trimethylolpropane and hexanetriol in a proportion for an excess of isocyanate groups; and biuret type adducts and isocyanurate ring adducts of the aforementioned urethanated adducts.

The block polyisocyanate preferably is one obtained by addition of a blocking agent to the isocyanate groups of the polyisocyanate compound, wherein the block polyisocyanate compound produced by the addition is stable at ordinary temperature but when heated to the baking temperature of the coated film (usually about 80-200° C.), allows the blocking agent to dissociate to regenerate the free isocyanate groups. As examples of blocking agents that satisfy these conditions there may be mentioned phenol-based blocking agents such as phenol, cresol, xylenol, nitrophenol, ethylphenol, hydroxydiphenyl, butylphenol, isopropylphenol, nonylphenol, octylphenol and hydroxymethyl benzoate; lactam-based blocking agents such as ε-caprolactam, δ-valerolactam, γ-butyrolactam and β-propiolactam; aliphatic alcohol-based blocking agents such as methanol, ethanol, propyl alcohol, butyl alcohol, amyl alcohol and lauryl alcohol; ether-based blocking agents such as ethyleneglycol monomethyl ether, ethyleneglycol monoethyl ether, ethyleneglycol monobutyl ether, diethyleneglycol monomethyl ether, diethyleneglycol monoethyl ether, propyleneglycol monomethyl ether and methoxymethanol; benzyl alcohol; glycolic acid; glycolic acid ester-based blocking agents such as methyl glycolate, ethyl glycolate and butyl glycolate; lactic acid ester-based blocking agents such as lactic acid, methyl lactate, ethyl lactate and butyl lactate; alcohol-based blocking agents such as methylolurea, methylolmelamine, diacetone alcohol, 2-hydroxyethyl acrylate and 2-hydroxyethyl methacrylate; oxime-based blocking agents such as formamide oxime, acetamide oxime, acetooxime, methylethylketooxime, diacetylmonooxime, benzophenoneoxime and cyclohexaneoxime; active methylene-based blocking agents such as dialkyl malonate esters including dimethyl malonate, diethyl malonate, diisopropyl malonate, di-n-butyl malonate, methyldiethyl malonate, benzylmethyl malonate and diphenyl malonate, acetoacetic acid esters including methyl acetoacetate, ethyl acetoacetate, isopropyl acetoacetate, n-propyl acetoacetate, benzyl acetoacetate and phenyl acetoacetate, and acetylacetone; mercaptane-based blocking agents such as butylmercaptane, t-butylmercaptane, hexylmercaptane, t-dodecylmercaptane, 2-mercaptobenzothiazole, thiophenol, methylthiophenol and ethylthiophenol; acid amide-based blocking agents such as acetoanilide, acetanisidide, acetotoluide, acrylamide, methacrylamide, acetic acid amide, stearic acid amide and benzamide; imide-based blocking agents such as succinic acid imide, phthalic acid imide and maleic acid imide; amine-based blocking agents such as diphenylamine, phenylnaphthylamine, xylidine, N-phenylxylidine, carbazole, aniline, naphthylamine, butylamine, dibutylamine and butylphenylamine; imidazole-based blocking agents such as imidazole and 2-ethylimidazole; pyrazole-based blocking agents such as 3,5-dimethylpyrazole; urea-based blocking agents such as urea, thiourea, ethyleneurea, ethylenethiourea and diphenylurea; carbamic acid ester-based blocking agents such as phenyl N-phenylcarbaminate; imine-based blocking agents such as ethyleneimine and propyleneimine; and sulfurous acid salt-based blocking agents such as sodium bisulfite and potassium bisulfite. From the viewpoint of low-temperature curability and compatibility with the modified polyolefin water-dispersed (A) and resin (B), there are especially preferred block polyisocyanates obtained using active methylene-based blocking agents.

Blocked polyisocyanates that have been rendered water dispersible may also be used as the aforementioned block polyisocyanates. Examples of blocked polyisocyanates that have been rendered water dispersible include blocked polyisocyanates wherein the isocyanate groups of the polyisocyanate compound are blocked with a blocking agent containing hydroxymonocarboxylic acid, and which are imparted with water dispersibility by neutralization of the carboxyl groups introduced by the hydroxymonocarboxylic acid, as well as blocked polyisocyanates that have been dispersed in water by addition of a surfactant or by reaction.

Such epoxy compounds are not particularly restricted so long as they have two or more epoxy groups in the molecule, and any known ones may be used, such as bisphenol-type epoxy resins, novolac-type epoxy resins and polyethyleneglycol diglycidyl ether. The epoxy compound may be used after being dispersed in water if necessary.

The crosslinking agent content may usually be in a range of no greater than 40 mass % and especially in the range of 3-30 mass % of the total resin solid portion in the composition, from the viewpoint of compatibility with the aqueous dispersion (A) or resin (B) and the curability, adhesion and water resistance of the formed coated film.

The composition of the invention may also, if necessary, contain a nitrogen-containing compound such as an amine or amide with a polyoxyalkylene chain, from the viewpoint of improving long-term storage stability of component (D) and enhancing the finished appearance and water-resistant adhesion. Such a nitrogen-containing compound preferably has a molecular weight in the range of 100-4,000, more preferably 200-2,000 and even more preferably 300-1,500, and an HLB value in the range of 8-18, more preferably 10-17 and even more preferably 13-16. The nitrogen-containing compound is also preferably used in an amount in the range of 2-200 parts by mass and preferably 5-120 parts by mass to 100 parts by mass of component (D).

The composition of the invention may also, if necessary, containing suitable amounts of coating material additives such as curing catalysts, thickeners, antifoaming agents, organic solvents, surface control agents, and the like.

As mentioned above, the aqueous primer composition of the invention may be coated onto a plastic molded article to form a coated film with excellent adhesion, humidity resistance and gasohol resistance.

As examples of plastic molded articles there may be mentioned automobile outside platings on bumpers, spoilers, grills, fenders and the like; and plastic molded articles used on the outside platings of household electrical appliances; which are most suitably made of materials such as polyolefins obtained by (co)polymerization of one or more C2-10 olefins such as ethylene, propylene, butylene or hexene, although the composition of the invention may also be applied to polycarbonates, ABS resins, urethane resins, polyamides and the like.

Such plastic molded articles may be subjected to appropriate degreasing or rinsing treatment by known methods prior to coating of the composition of the invention.

The composition of the invention may be coated by air spraying, airless spraying, dip coating, brushing or the like onto the plastic molded article, normally to a dry film thickness in the range of 1-40 μm and preferably 5-30 μm. The coated film surface obtained after coating the composition may, if necessary, be treated by setting at room temperature for 1-60 minutes or by preheating at a temperature of about 40-80° C. for 1-60 minutes, or it may be cured by heating at a temperature of about 60-140° C. and preferably about 70-120° C. for about 20-40 minutes.

The primer coating film formed in the manner described above can impart a conductive property and preferably has a surface resistivity of no greater than $1 \times 10^8 \Omega/\square$. Satisfactory electrostatic coating as a conductive primer coating film can be accomplished by the steps described hereunder. Measurement of the "surface resistivity" (units: $\Omega/\square$) can be performed using a "TREK MODEL 150" (surface resistance meter, trade name of TREK, Inc.) after the coated film applied to a dry film thickness of about 15 μm has been dried at 80° C. for 10 minutes.

As mentioned above, the plastic molded article onto which the composition of the invention has been coated may be electrostatically coated with a top coat. The top coat may be applied as a simple pigmented coating, or the pigmented coating may be used as a base coating material for successive coating of the base coating material and a clear coating material.

The pigmented coating may be any known one, which will generally be composed mainly of a coloring component such as a color pigment, luster pigment or dye and resin components such as a base resin and crosslinking agent, with an organic solvent and/or water as the primary solvent.

As examples of base resins to be used in the pigmented coating there may be mentioned acrylic resins, polyester resins and alkyd resins with crosslinkable functional groups such as hydroxyl, epoxy, carboxyl and silanol groups. As crosslinking agents there may be mentioned amino resins such as melamine resins or urea resins, or (block) polyisocyanates, polyepoxides, polycarboxylic acids and the like that are capable of reacting with the functional groups.

The pigmented coating may also, if necessary, contain appropriate amounts of paint additives such as extender pigments, curing catalysts, ultraviolet absorbers, coated surface modifiers, rheology controlling agents, antioxidants, antifoaming agents, waxes, antiseptic agents and the like.

The pigmented coating may be electrostatically coated onto the uncured or cured primer coating film, usually to a dry film thickness in the range of 5-50 μm and preferably 10-20 μm, and the obtained coated film surface treated if necessary by setting at room temperature for 1-60 minutes or preheating at about 40-80° C. for 1-60 minutes, or heated for curing at about 60-140° C. and preferably about 80-120° C. for a period of 20-40 minutes.

As clear coatings there may be used organic solvent-based or aqueous thermosetting coating materials composed mainly of resin components such as a base resin and crosslinking agent and an organic solvent or water, if necessary also comprising paint additives such as ultraviolet absorbers, light stabilizers, curing catalysts, coated surface modifiers, rheology controlling agents, antioxidants, antifoaming agents, waxes and the like, and having a degree of transparency allowing the underlying coated film to be visible through the formed clear coated film.

As examples of base resins there may be mentioned acrylic resins, polyester resins, alkyd resins, fluorine resins, urethane resins and silicon-containing resins containing at least one type of crosslinkable functional group such as a hydroxyl, carboxyl, silanol or epoxy group, with hydroxyl group-containing acrylic resins being particularly preferred. As crosslinking agents there may be mentioned melamine resins, urea resins, (block) polyisocyanate compounds, epoxy compounds, carboxyl group-containing compounds, acid anhydrides, alkoxysilane group-containing compounds and the like, which are capable of reacting with the functional groups, and polyisocyanate compounds are especially preferred among these.

The clear coating may be coated by electrostatic coating onto the uncured or cured color base coated film, to a dry film thickness in the range of 10-50 μm and preferably 20-40 μm, and if necessary surface treating the obtained coated film surface by setting at room temperature for 1-60 minutes or preheating at about 40-80° C. for 1-60 minutes, followed by heating for curing at about 60-140° C. and preferably about 70-120° C. for a period of 20-40 minutes.

A plastic molded article is thus obtained having a colored base coated film and clear coated film coated on a primer coating film according to the invention.

The present invention will now be explained in greater detail by examples. Unless otherwise specified, the "parts" and "%" values throughout the examples represent parts by mass and mass %.

Production of Modified Polyolefin Aqueous Dispersion

PRODUCTION EXAMPLE 1

After hot melting 100 g of maleic anhydride-grafted polypropylene (modified by addition of maleic acid to 4 mass % with respect to polypropylene obtained using a metallocene-based catalyst, and having a melting point of 80° C., Mw of approximately 150,000 and a Mw/Mn ratio of approximately 2.5) in a four-necked flask equipped with a stirrer, condenser tube, thermometer and dropping funnel at 140° C., 15 g of polyoxyethylene stearyl ether ("NEWCOL 1820", polyoxyethylene compound with a hydroxyl group at one end, product of Nippon Nyukazai Co., Ltd.) was added and the mixture was reacted at 140° C. for 4 hours while stirring. After the reaction, the mixture was cooled to 90° C., deionized water was added and filtration was performed to obtain a modified polyolefin aqueous dispersion (A-1) with a solid content of 30%.

PRODUCTION EXAMPLE 2

After hot melting 200 g of maleic anhydride-grafted polypropylene (modified by addition of maleic acid to 4 mass % with respect to polypropylene obtained using a metallocene-based catalyst, and having a melting point of 80° C., Mw of approximately 150,000 and a Mw/Mn ratio of approximately 2.5) in a four-necked flask equipped with a stirrer, condenser tube, thermometer and dropping funnel at 120° C., 10 g of 2-hydroxyacrylate, 0.1 g of a polymerization inhibitor (di-t-butylhydroxytoluene) and 2.0 g of triethylamine were added and the mixture was stirred for 1 hour. Next, 30 g of polyethyleneglycol monomethacrylate ("BLEMMER PE-350", product of NOF Corp.) and 0.3 g of a polymerization initiator ("PERBUTYL O", product of NOF Corp.) were added while stirring at 120° C. for 1 hour for reaction. After the reaction, 4 g of triethylamine was added and the mixture stirred for 30 minutes, after which it was cooled to 90° C., deionized water was added and filtration was performed to obtain a modified polyolefin aqueous dispersion (A-2) with a solid content of 30%.

Production of Hydroxyl Group-Containing Acrylic Resin Solution

After placing 40 parts of propyleneglycol monomethyl ether in a reactor equipped with a stirrer, reflux condenser and thermometer, it was heated and held at 120° C., after which a mixture of 53 parts of cyclohexyl methacrylate, 20 parts of n-butyl acrylate, 21 parts of 2-hydroxyethyl acrylate, 6 parts of acrylic acid and 5 parts of azobisisobutyronitrile was added dropwise over a period of 3 hours. After the dropwise addition, the mixture was allowed to mature for 1 hour at the same temperature, and a mixture of 1 part of azobisdimethylvaleronitrile and 10 parts of propyleneglycol monomethyl ether was added dropwise over a period of 1 hour, the mixture was allowed to mature further for 1 hour, and then 7.4 parts of dimethylethanolamine and 193 parts of deionized water were added while stirring to obtain a hydroxyl group-containing acrylic resin solution (B-1) with an acid value of 47 mgKOH/g, a hydroxyl value of 101 mgKOH/g and a mass-average molecular weight of approximately 10,000.

Production of Aluminum Dispersion

After placing 120 parts of propyleneglycol monomethyl ether in a reactor equipped with a stirrer, a temperature regulator and a cooler, heating to 110° C. and holding it at that temperature, 103 parts of a mixture (I) comprising 6 parts of 2-methacryloyloxyethyl acid phosphate (molecular weight: 210), 34 parts of acid phosphoxypenta(oxypropylene)glycol monomethacrylate (molecular weight: 456), 30 parts of n-butyl acrylate, 20 parts of styrene, 10 parts of 2-hydroxyethyl acrylate and 3 parts of t-butylperoxy-2-ethyl hexanoate was added dropwise over a period of 4 hours, and upon completion of the dropwise addition, the obtained mixture was allowed to mature while stirring for 1 hour. Next, an initiator solution comprising 1 part of t-butylperoxy-2-ethyl hexanoate and 30 parts of propyleneglycol monomethyl ether was added dropwise over a period of 1 hour, and upon completion of the dropwise addition the obtained mixture was allowed to mature for 1 hour while stirring to obtain a dispersion resin (P1). The acid value of the obtained pigment dispersion resin (P1) was 112 mgKOH/g, the hydroxyl value was 48 mgKOH/g, the mass-average molecular weight was 17,000 and the solid concentration was 40%.

An aluminum dispersion (D-1) was obtained by uniformly mixing 17.8 parts of the aluminum pigment paste "ALPASTE 55-519" (trade name of Toyo Aluminium, KK., mean length: approximately 15 μm, mean thickness: approximately 0.1 μm, aluminum powder content: 66%), 25 parts of ethyleneglycol monobutyl ether, 8 parts of the pigment dispersion resin (P1) obtained in the manner described above and 0.2 part of 2-(dimethylamino)ethanol.

Preparation of Aqueous Primers

EXAMPLE 1

After combining 50 parts by solid mass of the modified polyolefin aqueous dispersion (A-1), 20 parts by solid mass of the hydroxyl group-containing acrylic resin solution (B-1), 30 parts by solid mass of an aqueous urethane resin (B-2) ("UCOAT UX-310", urethane dispersion by Sanyo Chemical Industries, Ltd.), 75 parts of conductive material (C1-1) (*3), 75 parts of conductive material (C2-1) (*4) and 10 parts by solid mass of the aluminum dispersion (D-1) by ordinary methods, the mixture was diluted with deionized water to a solid content of 35% to obtain aqueous primer (1).

EXAMPLES 2-12 AND COMPARATIVE EXAMPLES 1-6

Aqueous primers (2)-(18) were obtained in the same manner as Example 1, except that the mixing compositions were as shown in Table 1.

The contents shown in Table 1 are expressed as solid portions, and (*1)-(*6) in Table 1 are as follows. (*1) Modified polyolefin aqueous dispersion (A-3): Ethylene-propylene copolymer (ethylene content: 5%) obtained using a metallocene-based catalyst and modified by addition of maleic acid to 8 mass % with respect to the copolymer, exhibiting a melting point of 80° C., a Mw of approximately 100,000 and a Mw/Mn ratio of about 2.1, neutralized with dimethylethanolamine, and dispersed in water using 10 parts of an emulsifier with respect to 100 parts of the polypropylene/ethylene copolymer. (*2) Modified polyolefin aqueous dispersion (A-4): "EH-801", trade name of Toyokasei Co., Ltd., chlorinated polyolefin aqueous dispersion with a chlorination degree of 16% and a solid content of 30%. (*3) Conductive material (C1-1): Globular conductive titanium oxide powder with a tin oxide-containing conductive layer on the surface, produced according to the method described in Production Example 1 of International Patent Publication No. WO2005/012449, having a mean particle size of approximately 0.25 μm. (*4) Conductive material (C2-1): Flaky conductive titanium oxide powder with a tin oxide-containing conductive layer on the surface, produced according to the method described in Example 3 of International Patent Publication No. WO2004/010439, having a mean length of approximately 10 μm and a mean thickness of approximately 0.5 μm. (*5) "JR-806", titanium white by Tayca Corp. (*6) Nitrogen-containing compound: Polyoxyethylenelaurylamine. (*7) Conductive material (C1-2): "W-1", globular conductive powder with antimony-doped tin oxide layer on the surface, product of Mitsubishi Materials Corporation. (*8) Conductive material (C1-3): "ET500W", globular conductive powder with antimony-doped tin oxide layer on the surface, product of Ishihara Sangyo Kaisha, Ltd. (*9) Conductive material (C2-2): "MINATEC 40CM", mica with antimony-doped tin oxide layer on the surface, product of Merck, Ltd. (*10) Melamine resin: "Cymel 325", product of Nihon Cytec Industries Inc.

TABLE 1

| Aqueous primer | Examples | | | | | | | | | | | | Comparative Examples | | | | | |
|---|---|---|---|---|---|---|---|---|---|---|---|---|---|---|---|---|---|---|
| | 1 (1) | 2 (2) | 3 (3) | 4 (4) | 5 (5) | 6 (6) | 7 (7) | 8 (8) | 9 (9) | 10 (10) | 11 (11) | 12 (12) | 1 (13) | 2 (14) | 3 (15) | 4 (16) | 5 (17) | 6 (18) |
| Modified polyolefin aqueous dispersion (A-1) | 50 | 50 | | 30 | 50 | | | | | | | | 50 | 50 | 50 | | | |
| Modified polyolefin aqueous dispersion (A-2) | | | 50 | | | | | | | | | | | | | | | |
| Modified polyolefin aqueous dispersion (A3) (*1) | | | | | | 50 | | | | | | | | | | | | |
| Modified polyolefin aqueous dispersion (A4) (*2) | | | | | | | 50 | 30 | 30 | 30 | 30 | 30 | | | | 30 | 30 | 30 |
| Resin (B-1) | 20 | 20 | 20 | 40 | 20 | 20 | 20 | 40 | 40 | 40 | 40 | 40 | 20 | 20 | 20 | 40 | 40 | 40 |
| Resin (B-2) | 30 | 30 | 30 | 30 | 30 | 30 | 30 | 20 | 20 | 30 | 30 | 20 | 30 | 30 | 30 | 20 | 30 | 20 |
| Conductive material (C1-1) (*3) | 75 | 50 | 100 | 150 | 150 | 150 | 150 | 150 | 100 | | | | 150 | 100 | | 150 | 30 | 100 |
| Conductive material (C1-2) (*7) | | | | | | | | | | 150 | 100 | | | | | | | |
| Conductive material (C1-3) (*8) | | | | | | | | | | | | 100 | | | | | | |
| Conductive material (C2-1) (*4) | 75 | 50 | 50 | | | | | | | | | | | 50 | | | 100 | |
| Conductive material (C2-2) (*9) | | | | | | | | | | | | | | | | | | |
| Aluminum dispersion (D-1) ALPASTE 55-519 | 10 | 10 | 10 | 10 | 5 | 10 | 10 | 10 | 10 | 5 | 5 | 5 | | | 10 | | | 40 |
| JR-806 (*5) | | | | | | | | | | | | | 50 | | 150 | | 10 | |
| Nitrogen-containing compound (*6) | | | | | | 3 | 3 | | | | | | | | | | | |
| Melamine resin (*10) | | | | | | | | | | 10 | 10 | | | | | 10 | | 10 |
| Conductivity | VG | VG | VG | VG | G | VG | VG | VG | G | VG | G | VG | F | F | P | VG | G | G |
| Brightness (L value) | 80 | 78 | 82 | 82 | 84 | 82 | 82 | 81 | 80 | 81 | 82 | 85 | 85 | 85 | 90 | 81 | 40 | 81 |
| Initial adhesion | G | G | G | G | G | G | G | G | G | G | G | G | G | G | G | G | F | G |
| Water resistance (adhesion) | G | G | G | G | G | G | G | G | G | G | G | G | G | G | G | G | F | P | P |
| Recoat adhesion | G | G | G | G | G | G | G | G | G | G | G | G | G | G | G | F | P | P |

Preparation of Test Coated Articles

The aqueous primers (1)-(18) prepared in the manner described above were each spray coated onto (degreased) polypropylene molded into the shape of a bumper to a dry film thickness of about 15 μm, and after 3 minutes of preheating at 80° C., "SOFLEX 415H" (solvent-type colored base coat material, product of Kansai Paint Co., Ltd.) was electrostatically coated thereon as a colored base coat material to a dry film thickness of about 15 μm, preheating was continued for 3 minutes at 80° C., "SOFLEX 7500H CLEAR" (acryl/urethane-based solvent-type clear coating, product of Kansai Paint Co., Ltd.) was electrostatically coated thereover as a clear coating to a dry film thickness of about 30 μm, and the bumper was heat dried at 80° C. for 30 minutes to prepare test coated articles.

Each of the test coated articles prepared as described above was provided for the following performance test. The results are summarized in Table 1.

Performance Test Methods (*1) Conductivity: Primer coating films formed by spray coating each of the aqueous primers (1)-(18) onto a (degreased) polypropylene board to a dry film thickness of approximately 15 μm were heated at 80° C. for 5 minutes, and then the surface resistivity (Ω/□) of each coated film surface was measured at 20° C. using a "MODEL150" (trade name of TREK, Inc.). VG: <1 MΩ, G: ≧1 MΩ and <100 MΩ, F: ≧100 MΩ and <10,000 MΩ, P: ≧10,000 MΩ.

(*2) Brightness (L value): Primer coating films formed by spray coating each of the aqueous primers (1)-(18) onto a (degreased) polypropylene board to a dry film thickness of approximately 15 μm were heated at 80° C. for 5 minutes, and then the brightness L value of each coated film surface was measured using a "CR-300" (trade name of Minolta Corp.).

(*3) Initial adhesion: Lines were formed in the coated film surface of each test coated article to the base using a cutter to produce 100 squares of size 2 mm×2 mm, adhesive Cellophane Tape™ was attached to the surface, and the number of squares left on the coated film after rapidly peeling off the tape at 20° C. was determined. G: 100 squares (no peeling), F: 99-50 squares, P: ≦49 squares.

(*4) Water resistance: A portion of the coated bumper was cut from each test coated article and immersed for 10 days in hot water at 40° C., raised and dried, and then subjected to an adhesion test in the same manner as the initial adhesion test described above, and the number of squares left on the coated film was determined and evaluated in the same manner as above.

(*5) Recoat adhesion: Each of the test coated articles was allowed to stand at room temperature for one day, the same clear coating was reapplied onto the coated surface and cured, and then the article was allowed to stand at room temperature for one day and used for an adhesion test in the same manner as the initial adhesion test described above.

As explained above, the present invention can provide an aqueous primer composition that can form high-brightness and high-chroma paint colors on plastic molded articles and that is capable of forming primer coating films with sufficient conductivity and excellent water resistance and humidity resistance, and it is therefore an industrially useful invention.

What we claim is:

1. An aqueous primer composition, comprising: (A) a modified polyolefin aqueous dispersion; (B) an aqueous urethane resin and/or aqueous acrylic resin; (C) a conductive metal oxide with a tin oxide-containing conductive layer surface; and (D) aluminum flakes, wherein the solid mass ratio of component (A)/component (B) is in the range of 15/85-80/20, component (C) is present in a range of 50-300 parts by mass with respect to 100 parts by mass of the total resin solid portion in the composition, and component (D) is present in a range of 1-30 parts by mass with respect to 100 parts by mass of the total resin solid portion in the composition.

2. The aqueous primer composition according to claim 1, wherein the modified polyolefin aqueous dispersion (A) is obtained by dispersing an unsaturated carboxylic acid- or acid anhydride-modified polyolefin (i) in an aqueous medium.

3. The aqueous primer composition according to claim 1, wherein the modified polyolefin aqueous dispersion (A) is obtained by dispersing a polyolefin, prepared by modifying an unsaturated carboxylic acid- or acid anhydride-modified polyolefin (i) using a compound containing a polyoxyalkylene chain, in an aqueous medium.

4. The aqueous primer composition according to claim 1, wherein the conductive metal oxide (C) is a spherical conductive metal oxide (c-1).

5. The aqueous primer composition according to claim 1, wherein the conductive metal oxide (C) comprises a spherical conductive metal oxide (c-1) and conductive metal oxide (c-2) flakes.

6. The aqueous primer composition according to claim 5, wherein the conductive metal oxides (c-1) and (c-2) are used in a mass ratio in the range of (c-1)/(c-2)=50/50-99/1.

7. The aqueous primer composition according to claim 1, wherein the aluminum flakes (D) are pretreated with a phosphate group-containing resin (iv) with an acid value of 10-200 mgKOH/g, which is obtained by copolymerizing a phosphate group-containing polymerizable unsaturated monomer and another polymerizable unsaturated monomer.

8. The aqueous primer composition according to claim 7, wherein the aluminum flakes (D) and the phosphate group-containing resin (iv) are used in a mass ratio in the range of 50/50-85/15.

9. A plastic molded article coating method, comprising: coating a plastic molded article with an aqueous primer composition according to any one of claims 1 to 8; and electrostatically coating a top coat over the coated surface.

10. The coated article obtained by the coating method according to claim 9.

* * * * *